United States Patent
Tucker et al.

(10) Patent No.: US 10,013,363 B2
(45) Date of Patent: Jul. 3, 2018

(54) ENCRYPTION USING ENTROPY-BASED KEY DERIVATION

(71) Applicant: Honeywell International Inc., Morristown, NJ (US)

(72) Inventors: James L. Tucker, Clearwater, FL (US); Thomas Cordella, Tampa, FL (US); John D. Profumo, St. Petersburg, FL (US)

(73) Assignee: Honeywell International Inc., Morris Plains, NJ (US)

( * ) Notice: Subject to any disclaimer, the term of this patent is extended or adjusted under 35 U.S.C. 154(b) by 136 days.

(21) Appl. No.: 14/617,721

(22) Filed: Feb. 9, 2015

(65) Prior Publication Data
US 2016/0306750 A1   Oct. 20, 2016

(51) Int. Cl.
*G06F 12/14* (2006.01)
*H04L 9/08* (2006.01)

(52) U.S. Cl.
CPC ........ *G06F 12/1408* (2013.01); *H04L 9/0869* (2013.01); *G06F 2212/1052* (2013.01); *G06F 2212/402* (2013.01)

(58) Field of Classification Search
CPC ........... G06F 12/1408; G06F 2212/402; H04L 9/0869
See application file for complete search history.

(56) References Cited

U.S. PATENT DOCUMENTS

| 5,058,164 | A | 10/1991 | Elmer et al. |
| 5,987,572 | A | 11/1999 | Weidner et al. |
| 6,075,858 | A | 6/2000 | Schwartzman |
| 6,304,658 | B1 | 10/2001 | Kocher et al. |
| 6,907,595 | B2 | 6/2005 | Curd et al. |
| 7,054,446 | B2 | 5/2006 | Ishihara et al. |
| 7,117,372 | B1 | 10/2006 | Trimberger et al. |
| 7,120,696 | B1 * | 10/2006 | Au .................... H04L 9/12 380/260 |
| 7,185,205 | B2 | 2/2007 | Launchbury et al. |
| 7,305,084 | B2 | 12/2007 | Hawkes et al. |
| 7,328,384 | B1 | 2/2008 | Kulkarni et al. |
| 7,451,288 | B2 | 11/2008 | Goettfert et al. |
| 7,519,830 | B2 | 4/2009 | Mihm, Jr. et al. |

(Continued)

FOREIGN PATENT DOCUMENTS

CN   104346584 A   2/2015

OTHER PUBLICATIONS

Khaing et al., A Study of Key Management Systems in Storage Area Network, 2009.*

(Continued)

*Primary Examiner* — Hadi S Armouche
*Assistant Examiner* — Huan V Doan
(74) *Attorney, Agent, or Firm* — Shumaker & Sieffert, P.A.

(57) ABSTRACT

A system may encrypt the contents of a memory using an encryption key that is generated based on an entropy-based key derivation function. The system may generate a random value as a key split associated with an instance of writing data to memory. The system may generate an encryption key for encrypting the data using an entropy-based key derivation function based at least in part on the key split. The system may encrypt the data using the encryption key. The system may store the encrypted data and the key split to the memory.

13 Claims, 4 Drawing Sheets

(56) References Cited

U.S. PATENT DOCUMENTS

| | | | |
|---|---|---|---|
| 7,631,195 B1* | 12/2009 | Yu | G06F 21/72 |
| | | | 713/179 |
| 7,673,201 B1 | 3/2010 | Chan et al. | |
| 7,685,434 B2 | 3/2010 | Kaniz et al. | |
| 7,853,803 B2 | 12/2010 | Milliken | |
| 7,912,223 B2 | 3/2011 | Osaki | |
| 7,979,716 B2 | 7/2011 | Fiske | |
| 8,001,374 B2 | 8/2011 | Wise | |
| 8,151,333 B2 | 4/2012 | Zhu et al. | |
| 8,332,634 B2 | 12/2012 | Derouet | |
| 8,375,225 B1 | 2/2013 | Ybarra | |
| 8,379,841 B2 | 2/2013 | Taylor et al. | |
| 8,386,800 B2 | 2/2013 | Kocher et al. | |
| 8,589,695 B2 | 11/2013 | Parkinson et al. | |
| 8,594,326 B2 | 11/2013 | Kerins et al. | |
| 9,128,876 B2 | 9/2015 | Cordella et al. | |
| 2001/0021254 A1* | 9/2001 | Furuya | H04L 9/0625 |
| | | | 380/259 |
| 2002/0073326 A1 | 6/2002 | Fontijn | |
| 2002/0112161 A1 | 8/2002 | Thomas, III et al. | |
| 2002/0131592 A1 | 9/2002 | Hinnant | |
| 2002/0169972 A1 | 11/2002 | Tanaka et al. | |
| 2003/0037248 A1 | 2/2003 | Launchbury et al. | |
| 2003/0070083 A1* | 4/2003 | Nessler | G06F 21/575 |
| | | | 713/193 |
| 2004/0019782 A1 | 1/2004 | Hawkes et al. | |
| 2004/0078570 A1 | 4/2004 | Geiringer et al. | |
| 2004/0078576 A1* | 4/2004 | Geitinger | G06F 7/582 |
| | | | 713/181 |
| 2004/0103269 A1 | 5/2004 | Stark | |
| 2004/0117778 A1 | 6/2004 | Sehr et al. | |
| 2005/0177716 A1* | 8/2005 | Ginter | H04N 21/8358 |
| | | | 713/157 |
| 2005/0232415 A1 | 10/2005 | Little et al. | |
| 2005/0251866 A1* | 11/2005 | Kobayashi | G06F 21/78 |
| | | | 726/27 |
| 2006/0177065 A1* | 8/2006 | Halbert | H04L 9/0662 |
| | | | 380/277 |
| 2007/0073326 A1 | 3/2007 | Miller et al. | |
| 2007/0192592 A1 | 8/2007 | Goettfert et al. | |
| 2008/0059795 A1 | 3/2008 | Vogel | |
| 2008/0183656 A1 | 7/2008 | Perng et al. | |
| 2008/0260159 A1 | 10/2008 | Osaki | |
| 2010/0054475 A1 | 3/2010 | Schneider | |
| 2010/0095134 A1 | 4/2010 | Srinivasan et al. | |
| 2010/0115286 A1 | 5/2010 | Hawkes et al. | |
| 2010/0183146 A1 | 7/2010 | Leech | |
| 2010/0250967 A1 | 9/2010 | Miwa | |
| 2011/0219173 A1 | 9/2011 | Morita | |
| 2011/0314304 A1* | 12/2011 | Braams | G06F 21/79 |
| | | | 713/193 |
| 2012/0159184 A1 | 6/2012 | Johnson et al. | |
| 2013/0013934 A1 | 1/2013 | King et al. | |
| 2013/0080790 A1 | 3/2013 | Pean et al. | |
| 2013/0145177 A1* | 6/2013 | Cordella | G06F 12/1408 |
| | | | 713/193 |
| 2013/0236019 A1 | 9/2013 | Zaverucha et al. | |
| 2014/0006797 A1* | 1/2014 | Cordella | G06F 21/64 |
| | | | 713/189 |
| 2014/0037093 A1* | 2/2014 | Park | H04L 9/0894 |
| | | | 380/277 |
| 2014/0310527 A1* | 10/2014 | Veugen | H04L 9/3013 |
| | | | 713/171 |
| 2015/0171870 A1 | 6/2015 | Parker | |
| 2015/0195089 A1* | 7/2015 | Yajima | H04L 9/0869 |
| | | | 380/46 |

OTHER PUBLICATIONS

Hong et al., Dynamic Encryption Key Design and Management for Memory Data Encryption in Embedded Systems, 2013.*

Eastlake et al., Randomness Recommendations for Security, Dec. 1994, 30 pages.*

Niixon et al., True Random Number Generation for Cryptography, on the Cheap, 6 pages (Year: 2013).*

Nagaraj, N. et al., "Joint Entropy Coding and Encryption using Robust Chaos," School of Natural and Engineering Sciences, National Institute of Advanced Studies, Aug. 14, 2006, 24 pp.

DS5002FP Secure Microprocessor Chip, downloaded on Sep. 14, 2011, from http://pdfserv.maxim-ic.com/en/ds/DS5002-DS5002FP, 25 pp.

Huo et al., "PEM: a lightweight program memory encryption mechanism for embedded processor", ScienceDirect, The Journal of China Universities of Posts and Telecommunications, Feb. 2010, 17(1): 77-84.

Shi et al., "Memory-centric Security Architecture," HiPEAC 2005; Nov. 2005; Springer; 16 pp.

Singh, "A Taste of Computer Security," downloaded on Sep. 14, 2011, from http://www.kernelthread.com/publications/security/smemory.html, 6 pp.

Tapp, "Configuration Readback Capture in UltraScale FPGAs," XILINX; www.xilinix.com; Nov. 20, 2015, 24 pp.

Trimberger, et al., "Authenticated Encryption for FPGA Bitstreams," FPGA '11; Feb. 27-Mar. 1, 2011, pp. 83-86.

Wheeler, "A Bulk Data Encryption Algorithm," downloaded on Sep. 14, 2011, from http://www.cix.co.uk/~klockstone/wake.htm, 9 pp.

U.S. Appl. No. 15/346,487, by John D. Profumo, filed on Nov. 8, 2016.

* cited by examiner

ENCRYPTION USING ENTROPY-BASED KEY DERIVATION

STATEMENT REGARDING FEDERALLY SPONSORED RESEARCH OR DEVELOPMENT

This invention was made with Government support under Government Contract # FA8650-12-C-1303 awarded by USAF. The Government has certain rights in the invention.

TECHNICAL FIELD

The disclosure relates to data encryption, and, more particularly, encryption of data stored by a memory.

BACKGROUND

Some digital electronic systems include a memory that stores data, such as instructions used to control the operation of the digital electronic system, proprietary data, intellectual property, or any combination thereof. In some cases, a digital electronic system will include cryptographic features that help protect the contents of the memory from unauthorized access.

SUMMARY

In general, the disclosure is directed to devices, systems, and techniques for encrypting contents of a memory using an encryption key that is generated based on an entropy-based key derivation function, and devices and systems that implement the encryption algorithm described herein.

A unique key split can be generated for each data write to memory, and an encryption key for writing the data to memory can be non-linearly generated based on the key split associated with the data write. As a result, the encryption key may be generated using multiple levels of entropy, and the encryption key used to encrypt data that is stored to memory is unique and specific not only to a memory location in memory but is also unique to the specific instance of writing of the data to memory. As such, unique encryption keys can be generated for each individual data write to the same or different memory locations in memory.

In one aspect, the disclosure is directed to a method. The method includes generating a random value as a key split associated with an instance of writing a data to memory. The method further includes generating an encryption key for encrypting the data using an entropy-based key derivation function based at least in part on the key split. The method further includes encrypting the data using the encryption key. The method further includes storing the encrypted data and the key split to the memory.

In another aspect, the disclosure is directed to a system. The system includes a key split generation module configured to generate a random number as a key split associated with an instance of writing a data to memory. The system further includes a key derivation module configured to generate an encryption key for encrypting the data using an entropy-based key derivation function based at least in part on the key split. The system further includes an encryption and decryption module configured to encrypt the data using the encryption key. The system further includes the memory configured to store the encrypted data and the key split.

In another aspect, the disclosure is directed to a computer-readable medium containing instructions. The instructions cause a programmable processor to generate a random number as a key split associated with an instance of writing a data to memory, generate an encryption key for encrypting the data using an entropy-based key derivation function based at least in part on the key split, encrypt the data using the encryption key, and store the encrypted data and the key split to the memory.

In another aspect, the disclosure is directed to an article of manufacture comprising a computer-readable storage medium. The computer-readable storage medium comprises computer-readable instructions for execution by a processor. The instructions cause a programmable processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a programmable processor to perform the techniques described herein. The computer-readable medium may be non-transitory.

The details of one or more examples are set forth in the accompanying drawings and the description below. Other features, objects, and advantages in addition to those described below will be apparent from the description and drawings, and from the claims.

DETAILED DESCRIPTION

An encryption algorithm for—establishing the confidentiality of data stored by a memory, based on a cryptographic key to protect the data against authorized access is described in this disclosure. In addition, devices, systems, and techniques implementing the encryption algorithm are described. As described in further detail below, the encryption algorithm may be implemented to generate an encryption key using an entropy-based key derivation function, and data to be stored in memory may be encrypted and decrypted using the encryption key. In some examples, each piece of data that is written into memory is encrypted using a unique encryption key, such that data to be written into memory is encrypted using a unique encryption key for each instance of writing data to the same or different memory locations in memory. The encryption algorithm described herein can be used to encrypt and decrypt data in any system that includes a memory in which data is encrypted and decrypted.

Figure 1:
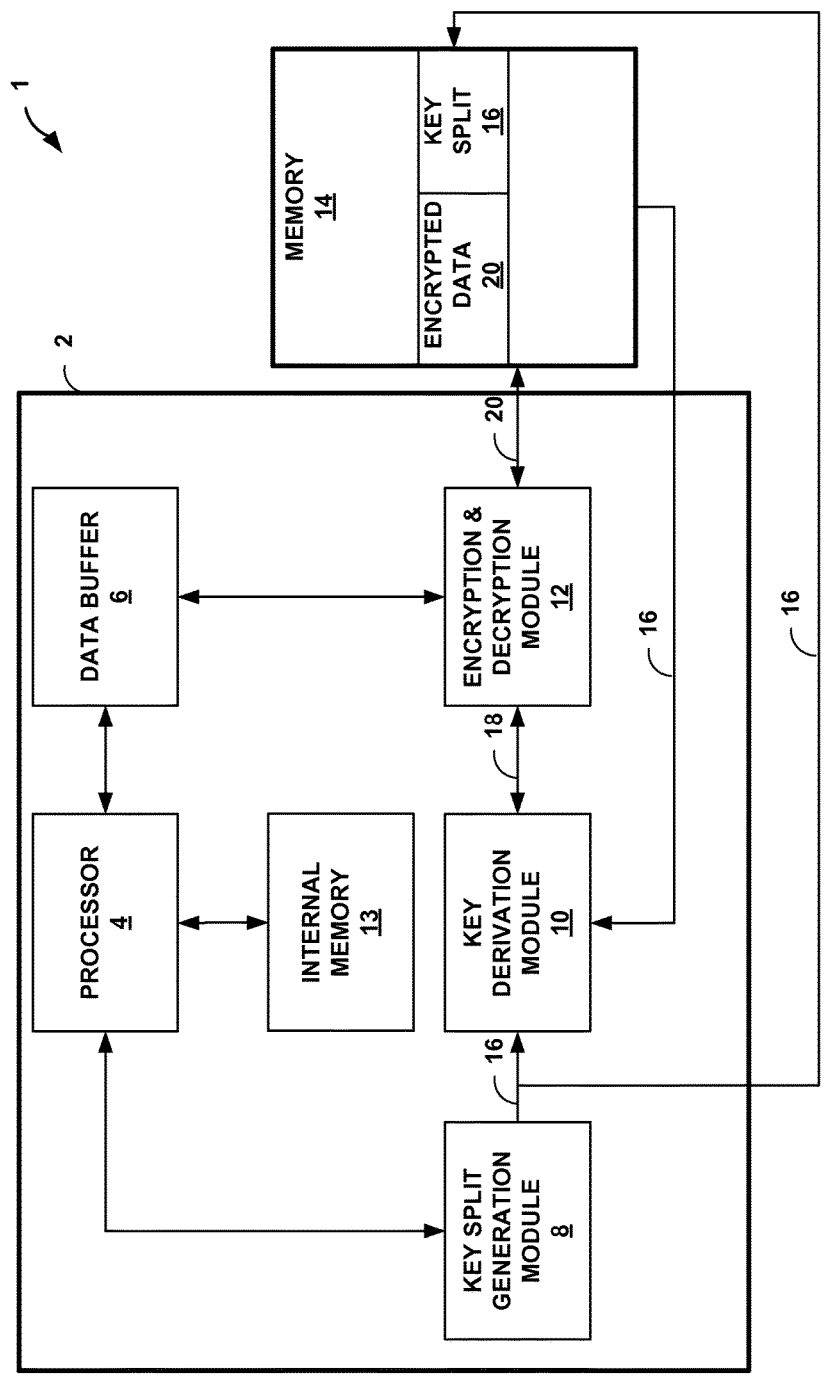
FIG. 1 is a block diagram illustrating an example system that includes a memory, and a control system, which is configured to store encrypted data to memory and to read encrypted data stored by memory.

FIG. 1 is a block diagram illustrating an example system 1 that includes memory 14, and control system 2, which is configured to encrypt data, store (also referred to herein as "write") the encrypted data to memory 14, read encrypted data stored by memory 14, and decrypt the encrypted data stored by memory 14. System 1 can be, for example, a digital electronic system. Control system 2 includes processor 4, data buffer 6, key split generation module 8, encryption key derivation module 10 (also referred to as "key derivation module"), encryption and decryption module 12, and internal memory 13.

Control system 2 can comprise any suitable arrangement of hardware, software, firmware, or any combination thereof, to perform the techniques attributed to control system 2, processor 4, key split generation module 8, key derivation module 10, and encryption and decryption module 12 herein. For example, control system 2 may include any one or more microprocessors, digital signal processors (DSPs), application specific integrated circuits (ASICs), field programmable gate arrays (FPGAs), or any other equivalent integrated or discrete logic circuitry, as well as any combinations of such components. Although processor 4, key split generation module 8, key derivation module 10, and encryption and decryption module 12 are described as separate modules, in some examples, processor 4, key split generation module 8, key derivation module 10, and encryption and decryption module 12 can be functionally integrated. For example, key split generation module 8, key derivation module 10, and encryption and decryption module 12 may be provided by the same hardware. In some examples, processor 4, key split generation module 8, key derivation module 10, and encryption and decryption module 12 correspond to individual hardware units, such as ASICs, DSPs, FPGAs, or other hardware units, or one or more common hardware units.

Memory 14 is configured to store data in encrypted form (also referred to herein as "cipher text" form). Memory 14 includes any volatile or non-volatile media, such as a random access memory (RAM), read only memory (ROM), non-volatile RAM (NVRAM), electrically erasable programmable ROM (EEPROM), flash memory, and the like. In some examples, memory 14 may be external to control system 2, e.g., may be external to a package in which control system 2 is housed. For example, control system 2 may be defined by an integrated circuit, a semiconductor device, or a plurality of semiconductor devices and may be housed in a semiconductor package, and memory 14 may be external to that semiconductor package. In some of these examples, electrical signals transmit between memory 14 and control system 2 via one or more electrically conductive pathways (e.g., a data bus and address bus). In other examples, memory 14 and control system 2 may wirelessly communicate with each other.

Data stored by memory 14 can include, for example, critical program information for the operation of system 1, protected intellectual property, and confidential information, such as classified information to which access is restricted by law or regulation to particular groups of persons. Encrypting data stored by memory 14 using the memory location specific encryption key described herein may help reduce unauthorized technology transfer, help protect any technological advantage provided to a particular entity from the knowledge and/or use of the stored data, and protect technological competitiveness afforded by the use of the stored data. For example, encrypting data stored by memory 14 may help minimize the possibility that system 1 may be reverse engineered by decreasing the accessibility to the contents of memory 14.

Processor 4 of control system 2 is configured to control the writing of data to memory 14 and reading of data from memory 14. In this way, processor 4 may also be referred to as a memory controller. As described in further detail below, the data written to memory 14 by processor 4 is encrypted by encryption and decryption module 12 prior to being written to memory 14, and the data read from memory 14 by processor 4 is correspondingly decrypted by encryption and decryption module 12.

In some examples, processor 4 may be configured to select (e.g., determine) the data to be written to memory 14. For example, processor 4 may generate the data or may receive the data to be written to memory 14 from an external source, such as an external component (e.g., an external computing device) or a user interface (not shown in FIG. 1) that is electrically and communicatively connected to processor 4. In addition, in some examples, processor 4 may be configured to select a location within memory 14 to which the data is to be written. In some examples, processor 4 may include a memory bus and an address bus (also referred to as a memory address bus), which is used to specify a location within memory 14 to which data is written to or read from.

Processor 4 can select a location within memory 14 to which the selected data is written using any suitable technique. In some examples, processor 4 may write data to memory 14 using data words of predetermined sizes (e.g., predetermined number of bits or bytes), such that data words of predetermined sizes are stored by memory 14. Memory 14 may, for example, include a larger data block comprising a plurality of data words of similar or identical sizes. In other examples, processor 4 may be configured to write data to memory 14 via single bytes. In these examples, data too large to be stored in a single byte may reside in multiple bytes occupying a sequence of consecutive addresses.

As discussed above, it may be desirable to minimize or even prevent tampering with system 1 in order to protect the contents of system 1, such as the contents stored by memory 14, the configuration of the components of system 1, and the like. Various techniques can be used to help prevent tampering with system 1. For example, in examples in which control system 2 is integrated into a single ASIC or FPGA, some components of system 1 may be integrated into a well-defined periphery (e.g., the periphery defined by a package in which the integrated circuit is housed). The integrated circuit housing or other package in which control system 2 and system 1 are contained (e.g., partially or completely enclosed) can act as a physical barrier that protects the components of system 1 from unauthorized access.

In addition, in some examples, an electronic tamper sensor can be integrated into the package in which control system 2 is housed and/or the package in which system 1 is housed or placed (e.g., a printed board on which system 1 is mounted is placed or a housing in which the printed board is placed). The electronic tamper sensor may be configured to detect tampering with system 1, such as by detecting physical movement of one or more component of system 1, impacts of a certain magnitude that indicate physical tampering, and the like. The electronic tamper sensor may be configured to take one or more actions in response to the detection of tampering. For example, the electronic tamper sensor can be configured to generate a notification to a user or processor 4 in response to detecting physical tampering, and, in some response, the user, processor 4, or another component can cause data stored by memory 14 and internal memory 13 to be inaccessible, such as by physical, chemical, or electrical destruction or by deletion of stored encryption keys or information necessary to determine the encryption key (e.g., a key split used to generate the encryption keys and/or decryption keys or an entropy table in key derivation module 10 that stores random values) from memory 14 or internal memory 13.

In the example shown in FIG. 1, memory 14 is external to control system 2, e.g., if control system 2 is on one or more integrated circuits, memory 14 can be physically separate from the integrated circuit. In some cases, it may be practical and desirable to implement additional memory 14 separate from control system 2, such as when relatively large amounts of randomly accessible memory is needed to support the operation of system 1 and it is not practical to incorporate the memory on the same one or more integrated circuits as control system 2.

In some examples, the data to be written to memory 14 under the control of processor 4 is stored in data buffer 6. In some examples, data buffer 6 can be a part of an internal memory 13 of control system 2 or can be separate from internal memory 13. Internal memory 13 is internal to control system 2 and, in some examples, stores instructions for execution by processor 4 for operation of processor 4 and other data used during operation of control system 2. In some examples in which control system 2 is an ASIC, FPGA or another integrated circuit, or otherwise comprises an ASIC, FPGA or another integrated circuit, internal memory 13 can be a memory element of the integrated circuit (e.g., a memory block or a flip-flop).

Electrically conductive pathways between control system 2 and components external to system 2, including memory 14, may provide a channel through with which system 1 can be electrically tampered. For example, an adversary (e.g., an unauthorized party) may probe electrical signal traces between control system 2 and the external components, and the information gathered through the probing may provide an adversary with the information with which the design of system 1 may be reverse engineered. In order to help minimize the possibility that any information obtained from probing the electrical signal traces between memory 14 and control system 2, control system 2 is configured to encrypt data that is written to memory 14 using an encryption key that is generated using an entropy-based key generation function. As a result, any information an adversary may obtain from probing the electrical signal traces between memory 14 and control system 2 otherwise obtaining data stored by memory 14 will be unintelligible to the adversary unless the adversary is able to decrypt the retrieved data. However, to decrypt the data stored by memory 14, the encryption key must be known. The encryption algorithm implemented by system 2 to encrypt the contents of memory 14 increases the difficulty with which the adversary may determine the encryption keys used to encrypt the contents of memory 14.

The encryption algorithm with which control system 2 encrypts data stored by memory 14 results in a unique encryption key for each instance of a data write to memory 14, such that control system 2 generates unique encryption keys for data writes to different memory locations and generates unique encryption keys even for each instance of writing data to the same memory location of memory 14. As a result, the adversary must determine multiple encryption keys in order to decrypt data stored at more than one location of memory 14, and the adversary must also determine multiple encryption keys for the same memory location of memory 14 if data is written to a memory location of memory 14 multiple times. Indeed, even if the adversary determines one encryption key for one location of memory 14, the data stored at the location may not provide the adversary with any useful information due to its relatively small content (e.g., a single data word), and the data stored at multiple memory locations may be necessary to obtain useful information (e.g., a sufficient amount of information to reverse engineer system 1). Furthermore, even if the adversary determines one encryption key for one instance of a data write to one location of memory 14, the encryption key may not be usable to decrypt data that is subsequently written to the same location of memory 14. Thus, by generating encryption keys that are specific to each instance of a data write, system 1 greatly increases the difficulty with which an adversary may decrypt data stored by memory 14.

Use of encryption keys that are generated via an entropy-based key derivation function, such that they are different for each time data is written into memory 14 may provide a cryptographically secure algorithm for enciphering data stored by memory 14. The encryption algorithm that uses the encryption keys may also help mitigate electronic tampering from at least two types of side channel attacks: simple power analysis and differential power analysis. A side channel attack may be, for example, an attack on system 1 based on information that is obtained from an analysis of the physical operation of system 1, such as the power consumed by system 1 during its operation and/or the sounds generated by system 1 during its operation. Side channel attacks may compromise the security of electrical devices (e.g., an ASIC, FPGA or another semiconductor device).

Simple power analysis is a side channel attack that involves visual examination of the power consumption (e.g., the current used) of an electrical device (e.g., system 1 over time. The electrical device may consume different amounts of power consumption as it performs different operations, such that variations in power consumption over time may evidence the different operations of the device. If the device is a cryptographic system that encrypts stored data, an adversary may be able to extract encryption keys from the power consumption profiles. Within some cryptographic systems, the unique power profiles may alert the adversary to the cryptographic standard being used. For example, systems that encrypt data using the Data Encryption Standard (DES) use 16 rounds, which are 16 identical stages of processing (e.g., transforming) used to convert plain data into ciphered data. These rounds can easily be seen on a digital oscilloscope and may tip off the adversary to the implementation of the DES to encrypt the stored data. As another example, systems that encrypt data using the Advanced Encryption Standard (AES) may use 10, 12, or 14 rounds to convert plain data into ciphered data, depending on the selected key strength.

Differential power analysis is a side channel attack in which an adversary may extract an encryption key (or other secret keys) by analyzing their power consumption from the outside of an electrical device. Differential power analysis may be a more advanced form of power analysis compared to simple power analysis because an adversary may be able to compute intermediate values within cryptographic computations by statistically analyzing data collected from multiple cryptographic operations. Differential power analysis attacks may be successful when the adversary is able to accumulate a statistically significant quantity of power samples over repeated cryptographic encryption/decryption operations using the same encryption key.

Other types of side channel attacks include correlation power analysis and a template attack. Correlation power analysis is similar to differential power analysis, and may be a side channel attack in which an adversary may determine secret encryption keys by correlating instantaneous power consumption to predicted nominal power consumption values. An adversary may use a template attack to evaluate noise emanating from an integrated circuit of system 1; the noise may be expected to follow a Gaussian distribution. The adversary may sample noise from system 1 and compare the sampled noise against a probabilistic noise profile, such can be used to reveal secret keys.

System 1 is configured to encrypt contents of memory 14 (referred to herein as "data" stored by memory 14) using key split generation module 8, key derivation module 10 and encryption and decryption module 12. Key split generation module 8 is configured to generate key split 16 that is associated with an instance of a data write to memory 14. Specifically, key split generation module 8 may be configured to generate a key split, such as key split 16, each time control system 2 writes encrypted data to memory 14. To generate key split 16, key split generation module 8 may generate a random value as key split 16, such as by using a random number generation algorithm. In these examples, the random value may also be referred to as a pseudo-random value. In other examples, key split generation module 8 may generate a truly random value, e.g., using one or more oscillators, radioactive decay models, or digital logic. As such, the term "random number" or "random value" as used throughout this disclosure may include both truly random values as well as pseudo-random values. By generating a random value as key split 16 for each instance of a data write to memory 14, key split generation module 8 may generate a key split that is unique for each instance of writing encrypted data to memory 14. Key split 16 can have suitable size (e.g., bits). In one example, key split 16 includes 32 bits of data. In other examples, processor 4 or a processor external to control system 2 may generate key split 16.

In some examples, key split generation module 8 may receive, from processor 4, an indication that processor 4 is to write data to memory 14 and, in response, key split generation module 8 may generate a random value, such as a random number, as key split 16 associated with that instance of writing data to memory 14. In some examples, key split generation module 8 may be a general purpose random number generator for control system 2, such that key split generation module 8 may also be configured to generate random values apart from generating key splits. For example, key split generation module 8 may also be configured to generate random values that are utilized by key derivation module 10, as will be discussed in further detail below with respect to FIG. 2.

Key split generation module 8 may output key split 16, which is received by key derivation module 10 as an input. Key derivation module 10 is configured to generate encryption key 18 using an entropy-based key derivation function based at least in part on key split 16 generated by key split generation module 8, and encryption and decryption module 12 may encrypt and decrypt data stored by memory 14 using encryption key 18. The encryption keys generated by key derivation module 10 may, similar to key split 16, be unique for each instance of writing data to memory 14. Because system 1 uses a symmetric key based encryption algorithm, encryption key 18 is used both to encrypt data stored by memory 12 and to decrypt the same data read from memory 12. As such, encryption key 18 may also be referred to as a decryption key when used to decrypt encrypted data. Key derivation module 10 is described in further detail with respect to FIG. 2.

Key derivation module 10 may output encryption key 18, which is received by encryption and decryption module 12 as an input. Processor 4 may also output the data that is to be encrypted and that is received by encryption and decryption module 12 as input. Encryption and decryption module 12 is configured to encrypt data to be written to memory 14 using encryption key 18 generated by key derivation module 10. Encryption and decryption module 12 is also configured to decrypt encrypted data stored in memory 14 using encryption key 18 generated by key derivation module 10. Encryption and decryption module 12 may encrypt the data prior to processor 4 writing the data to memory 14 (directly or indirectly encryption and decryption module 12). Encryption and decryption module 12 may be configured to encrypt and decrypt data using any suitable technique, such as by implement an AES algorithm, an DES algorithm, an RC5 algorithm, or any combination thereof.

In some examples, encryption and decryption module 12 implements a block cipher algorithm to encrypt data, such that data is processed predetermined word sizes. For example, if encryption and decryption module 12 utilizes an AES algorithm, plain or cipher text is processed in 128-bit word sizes (e.g., a 128-bit word is input to and output from encryption and decryption module 12). Thus, processor 4 may access memory 14 in word sizes that is based on the word size with which encryption and decryption module 12 encrypts data. Because encryption and decryption module 12 may process words having a size different than the size of the memory locations, in some examples, a single encryption key 18 may encrypt data that that spans more than one memory location of memory 14. For example, in the case of an AES algorithm, if memory 14 is configured as 64-bit RAM, system 1 may be configured such that processor 4 accesses 128 bits simultaneously, where the 128 bits correspond to two memory locations. The data written or read from the 128 bits simultaneously may be encrypted or decrypted, respectively, using the same encryption key 18. Alternatively, if data spans more than one memory location of memory 14, control system 2 may generate different key splits for each of the memory locations taken up by the data and may generate different encryption keys based on the different key splits for each of the memory locations, such that encryption and decryption module 12 encrypts each portion of data to be stored in a memory location in memory 14 using a different encryption key.

Responsive to encryption and decryption module 12 encrypting the data, control system 2 may be configured to encrypted data 20 to memory 14. Processor 4 may write encrypted data 20 to memory 14 (directly or indirectly encryption and decryption module 12). Control system 2 may also be configured to also store key split 16, which was used to generate encryption key 18 used to generate encrypted data 20, to memory 14. In some examples, control system 2 may store encrypted data 20 and key split 16 associated with encrypted data 20 into consecutive memory locations of memory 14, or may each be a portion of data that makes up the data stored at a particular memory location of memory 14. For example, if memory 14 is configured as 64-bit RAM, encrypted data 20 and key split 16 may each be 32-bit data that are both stored in a single memory location. In some examples, control system 2 may obscure key split 16 and may store the obscured key split 16 to memory 14. For example, processor 4 may apply an invertible function to key split 16 to obscure key split 16.

Control system 2 stores key split 16 to memory 14 so that control system 2 may use key split 16 to generate a decryption key to decrypt encrypted data 20 that is associated with key split 16. To decrypt encrypted data 20, control system 2 may read key split 16 from memory 14, including applying the invertible function to key split 16 to un-obscure key split 16, and may output key split 16 to key derivation module 10. Because system 1 uses a symmetric key based encryption algorithm in which the same encryption key is used to encrypt data stored by memory 14 and decrypt encrypted data 20 read from memory 14, key derivation module 10 may generate a decryption key based on key split 16 retrieved from memory 14 to decrypt encrypted data 20 stored in memory 14 that is the same as encryption key 8 used by encryption and decryption module 12 to encrypt data into encrypted data 20. Key derivation module 10 may output the decryption key to encryption and decryption module 12 and encryption and decryption module 12 may use the decryption key to decrypt encrypted data 20.

Figure 2:
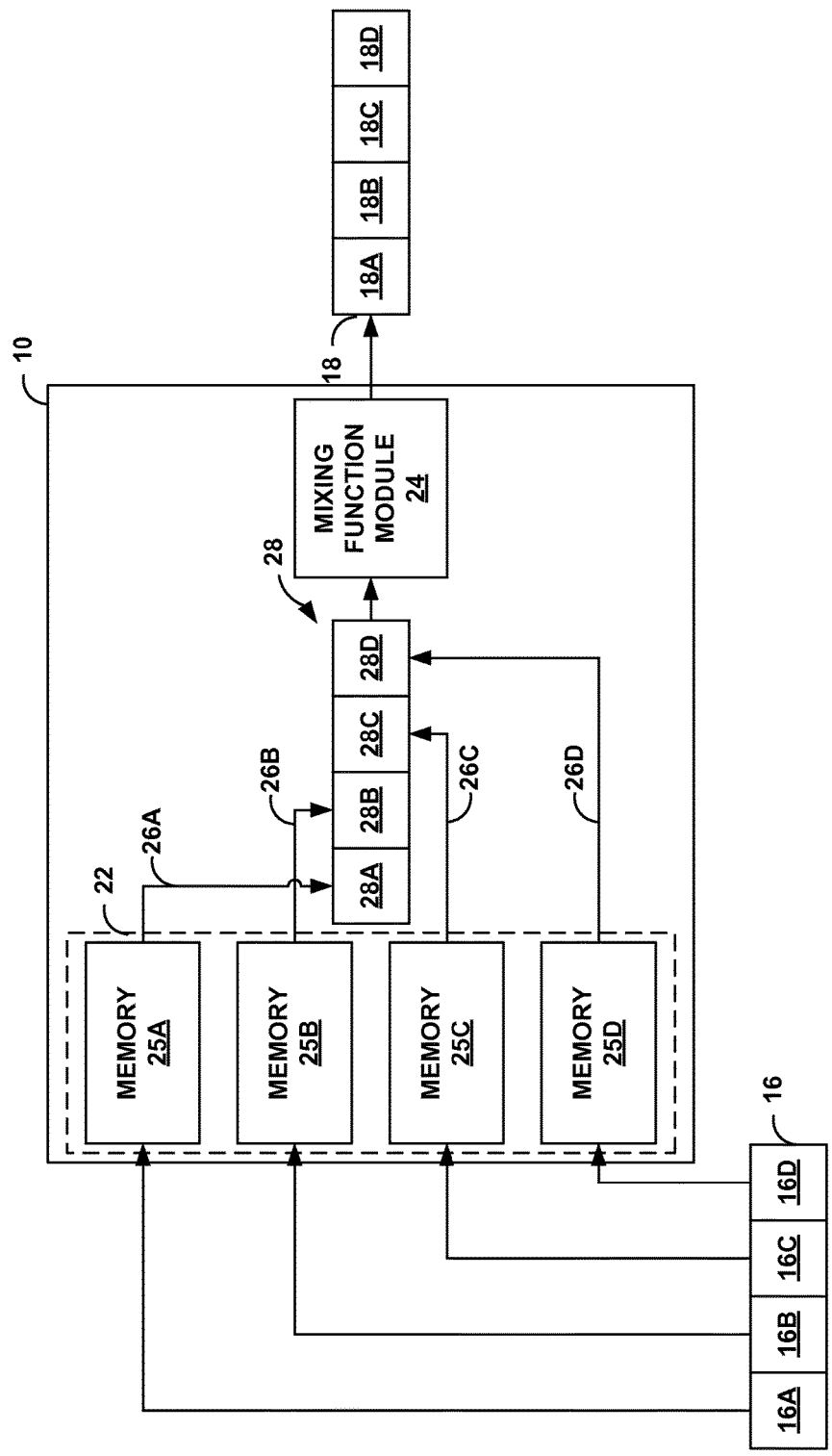
FIG. 2 is a functional block diagram of an example encryption key derivation module of the system of FIG. 1 in further detail.

FIG. 2 is a functional block diagram of an example encryption key derivation module 10, which is configured to generate a unique encryption key for each instance data is stored to a memory location of memory 14. As shown in FIG. 2, key derivation module 10 may include entropy table 22 and mixing function module 24.

Entropy table 22 may be memory (e.g., RAM modules and the like) that stores a set of random values, such as random numbers. In some examples, the random values that populates lookup table 22 is generated at some predetermined time, such as upon each power-up or power cycle of system 1, upon each reset negation of system 1, at regular intervals (e.g., once every hour, once every day, and the like), or according to some other predetermined schedule with which processor 4 is programmed. In some examples, lookup table 22 may persist its random values over several power cycles.

In some examples in which processor 4 populates entropy table 22 with a set of random values at predetermined times (e.g., upon power-up of system 1), processor 4 may, in response to a power-up of system 1 (e.g., at every power-up cycle), clear entropy table 22, generate, using key split generation module 8 or processor 4, the random values for entropy table 22, and populate entropy table 22 with the generated random values. For example, entropy table 22 may comprise random access memory that only stores information for use during a single power-up cycle, which may, in some examples, correspond to a single mission of a larger system in which system 1 is incorporated. In other examples, entropy table 22 retains a set of random values between power-up cycles of system 1.

Key derivation module 10 may receive key split 16 from key split generation module 8 and retrieve one or more random values from entropy table 22 based at least in part on key split 16, such that key derivation module 10 may generate encryption key 18 based on the one or more random values retrieved from entropy table 22. In this way, key derivation module 10 may create a non-linear translation between key split 16 and encryption key 18 generated from key split 16. The one or more random values retrieved from entropy table 22 may be a subset (i.e., fewer than all) of the set of random values stored in entropy table 22. For example, entropy table 22 may store a random value at each of a plurality of table entries of entropy table 22. Key derivation module 10 may use key split 16 to index into one or more table entries of entropy table 22 to retrieve a random value located at or otherwise associated with each of the one or more locations of entropy table 22. For example, entropy table 22 may be one or more memory modules where each random value of the set of random values in entropy table 22 is stored at a memory location of the one or more memory modules. Key derivation module 10 may use key split 16 to index into one or more memory locations of entropy table 22 to retrieve one or more random values located at the one or more locations of entropy table 22.

Key derivation module 10 may use portions of key split 16, where each portion of key split 16 is a non-overlapping subset (i.e., fewer than all) of the bits of key split 16, to index into portions of entropy table 22, such that each portion of key split 16 may index into a random value stored in entropy table 22. In this way, key derivation module 10 may divide key split 16 into a plurality of portions, and key derivation module 10 may use the portions of key split 16 to index into a plurality of random values stored in entropy table 22. In the example illustrated in FIG. 2, entropy table 22 includes memory modules 25A-25D ("memory modules 25") that are internal to the chip that comprises key derivation module 10. While entropy table 22 comprises four memory modules 25A-25D in the example of FIG. 2, in other examples entropy table 22 may include any number of memory modules. Memory modules 25 may, for example, be RAM modules that each has 8-bit memory addresses, where a 32-bit random value may be stored at each memory address. Key split 16 may be a 32-bit value, such that key derivation module 10 may utilize 8-bit portions of key split 16 to index into each of memory modules 25A-25D.

For example, key derivation module 10 may use key split portion 16A, which are bits 31 to 24 of 32-bit key split 16 that comprises a bit range of 0 to 31, to index into memory module 25A to retrieve the random value 26A located at the memory location of memory module 25A that corresponds to the value of key split portion 16A. Similarly, key derivation module 10 may use key split portion 16B, which are bits 23 to 16 of 32-bit key split 16, to index into memory module 25B to retrieve the random value 26B located at the memory location of memory module 25B that corresponds to the value of key split portion 16B. Further, key derivation module 10 may use key split portion 16C, which are bits 15 to 8 of 32-bit key split 16, to index into memory module 25C to retrieve the random value 26C located at the memory location of memory module 25C that corresponds to the value of key split portion 16C. In addition, key derivation module 10 may use key split portion 16D, which are bits 7 to 0 of 32-bit key split 16, to index into memory module 25D to retrieve the random value 26D located at the memory location of memory module 25D that corresponds to the value of key split portion 16D.

Key derivation module 10 may generate intermediate key 28 based at least in part on the one or more random values retrieved from entropy table 22. For example, if a single random value is retrieved from entropy table 22, key derivation module 10 may set intermediate key 28 to the random value retrieved from entropy table 22. In another example, if two or more random values are retrieved from entropy table 22, key derivation module 10 may combine the two or more random values retrieved from entropy table to generate intermediate key 28, such as by performing one or more bitwise logical operations (e.g., NOT, AND, OR, and/or XOR operations), performing one or more concatenation operations, and the like.

In the example illustrated in FIG. 2, key derivation module 10 may generate 128-bit intermediate key 28 from 32-bit random values 26A-26D. For example, key derivation module 10 may concatenate the four 32-bit random values 26A-26D to result in 128-bit intermediate key 28. For example, 32-bit random values 26-26D may be concatenated to form 128-bit intermediate key 28 such that bits 127-96 of intermediate key 28 comprise 32-bit random value 26A, bits 95-64 of intermediate key 28 comprise 32-bit random value 26B, bits 63-32 of intermediate key 28 comprise 32-bit random value 26C, and bits 31-0 of intermediate key 28 comprise 32-bit random value 26D.

Mixing function module 24 may receive intermediate key 28 as input and may generate encryption key 18 based at least in part on intermediate key 28. Specifically, Mixing function module 24 may perform a mixing function on intermediate key 28 to generate encryption key 18 from intermediate key 28, such that a single bit flip in intermediate key 28 impacts each bit in the generated encryption key 18. Mixing function module 24 may further generate encryption key 18 from intermediate key 28 such that there is a one-to-one mapping of intermediate key 28 to encryption key 18, such that there is no aliasing (e.g., such that two or more different intermediate keys do not result in the same encryption key). Mixing function module 24 may be implemented by hardware, software, firmware or any combination thereof.

In the example illustrated in FIG. 2, mixing function module 24 may perform a mixing function on a 128-bit intermediate key 28 to generate a 128-bit encryption key 18. Mixing function module 24 may generate encryption key 18 such that changing the values of one portion of bits of intermediate key 28 may affect not only the corresponding portion of encryption key 18 but may also affect one or more additional portions of encryption key 18, such that an attacker of system 1 may not be able to determine a correlation between values of a portion of intermediate key 28 and the values of the corresponding portion of intermediate key 28. In other words, mixing function module 24 may generate encryption key 18 from intermediate key 28 such that there is not a one-to-one correspondence between a value of a portion of the intermediate encryption key 28 and a value of a corresponding portion of the encryption key 18.

In the present disclosure, a portion of intermediate key 28 may be a subset (i.e., fewer than all) of bits of intermediate key 28. A portion of intermediate key 28 that covers a certain bit range of intermediate key 28 may correspond with a portion of encryption key 18 that covers the same bit range of encryption key. For example, intermediate key portion 28A may comprise bits 127-96 of intermediate key 28, intermediate key portion 28B may comprise bits 95-64 of intermediate key 28, intermediate key portion 28C may comprise bits 63-32 of intermediate key 28, and intermediate key portion 28D may comprise bits 31-0 of intermediate key 28. Further, intermediate key portion 28A may correspond with encryption key portion 18A that comprises bits 127-96 of encryption key 18, intermediate key portion 28B may correspond with encryption key portion 18B that comprises bits 95-64 of encryption key 18, intermediate key portion 28C may correspond with encryption key portion 18C that comprises bits 63-32 of encryption key 18, and intermediate key portion 28D may correspond with encryption key portion 18D that comprises bits 31-0 of encryption key 18.

As such, given intermediate key 28 comprising intermediate key portions 28A-28D, mixing function module 24 may perform a mixing function on intermediate key 28 to generate encryption key 18 comprising encryption key portions 18A-D, such that a change in one of the intermediate key portions 28A-28D affects more than just the corresponding portion of encryption key 18, but also affects one or more non-corresponding portions of resulting encryption key 18.

For example, given two intermediate keys that differ in the intermediate key portion that comprises bits 127-96 (i.e., intermediate key portion 28A), mixing function module 24 may generate resulting encryption keys for the respective two intermediate keys that may differ not just in bits 127-96 (i.e., enterprise key portion 18A) of enterprise key 18 that corresponds to bits 127-96 of intermediate key 28, but may also differ in bits 95-0 (i.e., enterprise key portions 18B-18D). In this way, an attacker of system 1 is not able to break down intermediate key 28 and enterprise key 18 down into its portions (i.e., into intermediate key portions 28A-28D and enterprise key portions 18A-18D) to determine a one-to-one mapping of values of intermediate key portion 28A to enterprise key portion 18A, values of intermediate key portion 28B to enterprise key portion 18B, values of intermediate key portion 28C to enterprise key portion 18C, and values of intermediate key portion 28D to enterprise key portion 18D.

Figure 3:
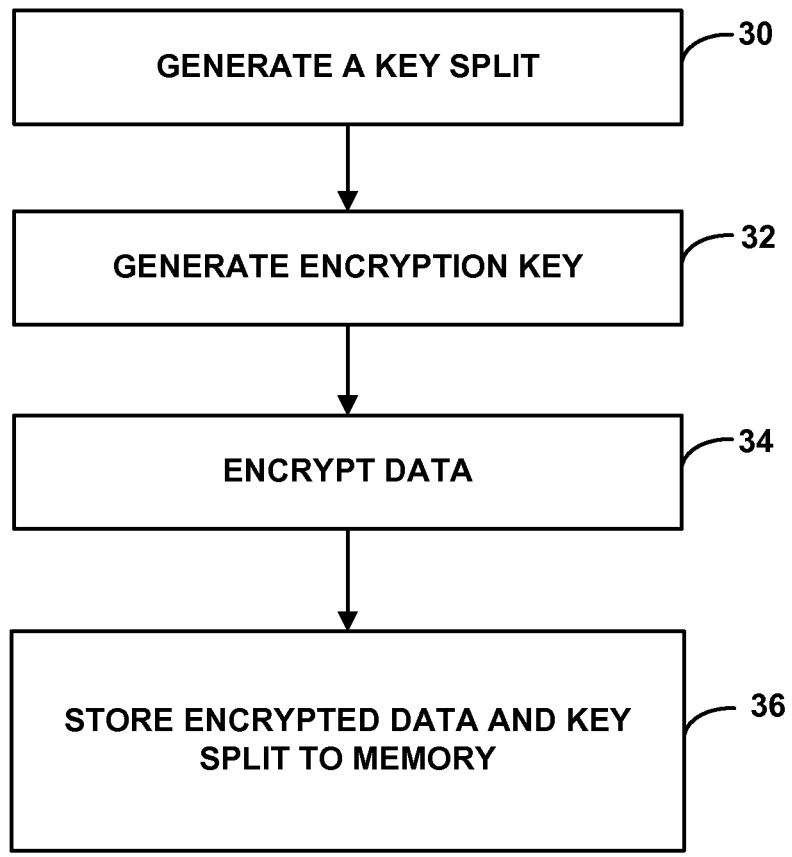
FIG. 3 is a flow diagram of an example technique for encrypting data stored in memory using an encryption key.

FIG. 3 is a flow diagram of an example technique with which system 1 may encrypt data stored by memory 14. The technique shown in FIG. 3 may be implemented, for example, during a write operation controlled by processor 4 or a processor of another device. While FIG. 3 is described with respect to system 1 (FIG. 1), in other examples, the technique shown in FIG. 3 can be implemented by another system alone or in combination with system 1. In accordance with the technique shown in FIG. 3, key split generation module 8 may generate a random number as key split 16 associated with writing a data to memory (30). As discussed above, key split generation module 8 may generate a random number as a key split each time control system 2 writes data to memory 14, such that key split generation module 8 may generate a unique key split for each data write to memory 14, even for data writes to the same memory location of memory 14. Key derivation module 10 may generate encryption key 18 using an entropy-based key derivation function based at least in part on key split 16 (32). Encryption and decryption module 12 may encrypt data 5 using encryption key 18 generated by key derivation module 10 to generate encrypted data 20 (34). Control system 2 may store encrypted data 20 and key split 16 to memory 14 (36).

In some examples, key split 16 is unique to the instance of writing of the data to memory 14. In some examples, generating encryption key 18 for encrypting the data using the entropy-based key derivation function further includes retrieving, from entropy table 22 populated with random values, one or more random values 26, and generating encryption key 18 based at least in part on the one or more random values 26. In some examples, retrieving the one or more random values 26 may further include indexing, using key split 16, into one or more locations of entropy table 22 to retrieve the one or more random values 26 associated with the one or more locations of entropy table 22.

In some examples, generating encryption key 18 may further include generating intermediate encryption key 28 based at least in part on the one or more random values and perform, by mixing function module 24, a mixing function on intermediate encryption key 28 to generate encryption key 18. In some examples, one or more random values 26 comprise a plurality of random values, and wherein generating intermediate encryption key 28 may further include generating intermediate encryption key 28 by combining the plurality of random values.

In some examples, performing the mixing function on intermediate encryption key 28 to generate encryption key 18 may further include performing the mixing function on intermediate encryption key 28 to generate the encryption key 18 such that there is not a one-to-one correspondence between a value of a portion of intermediate encryption key 28 and a value of a corresponding portion of encryption key 18.

In some example, system 1 may, responsive to a power-up cycle of system 1 comprising entropy table 22, clear entropy table 22, generate the random values for entropy table 22, and populate entropy table 22 with the generated random values.

Figure 4:
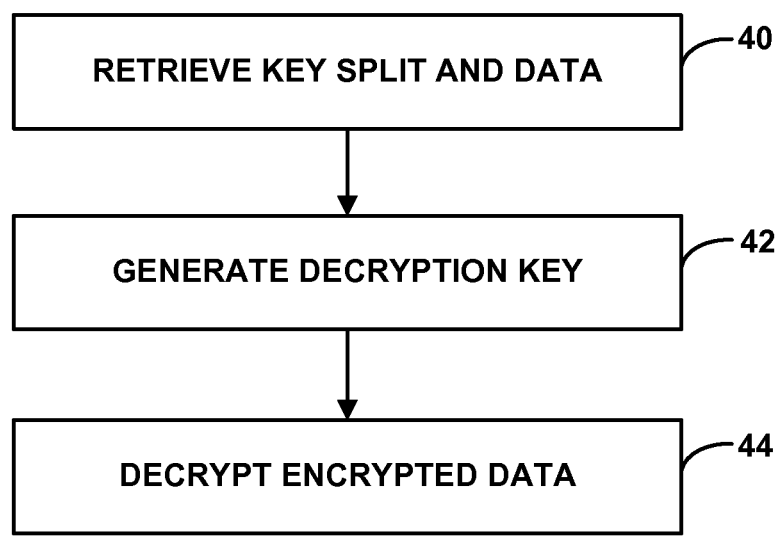
FIG. 4 is a flow diagram of an example technique for decrypting encrypted data stored in memory using a decryption key.

FIG. 4 is a flow diagram of an example technique with which system 1 may decrypt encrypted data 20 stored by memory 14. The technique shown in FIG. 4 may be implemented, for example, during a read operation controlled by processor 4 or a processor of another device. While FIG. 4 is described with respect to system 1 (FIG. 1), in other examples, the technique shown in FIG. 4 can be implemented by another system alone or in combination with system 1. In accordance with the technique shown in FIG. 4, control system 2 may retrieve key split 16 stored in memory 14 as well as encrypted data 20 (40). Key derivation module 10 may generate a decryption key based at least in part on key split 16 using the entropy-based key derivation function (42). Encryption and decryption module 14 may decrypt encrypted data 20 using the decryption key (44).

In some examples, decrypting encrypted data 20 may include retrieving, from entropy table 22 populated with the random values, the one or more random values, and generating the decryption key based at least in part on the one or more random values. In some examples, the decryption key to decrypt encrypted data 20 is the same as encryption key 18 used to encrypt data to result in encrypted data 20.

The techniques of this disclosure may be implemented in a wide variety of computer devices. Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The memory described herein that defines the physical memory addresses, which may be used as part of the described encryption, may also be realized in any of a wide variety of memory, including but not limited to, RAM, SDRAM, NVRAM, EEPROM, FLASH memory, dynamic RAM (DRAM), magnetic RAM (MRAM), or other types of memory.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

The invention claimed is:

1. A method comprising:
generating a random value as a key split associated with an instance of writing a data to memory, wherein the key split is unique to the instance of writing the data to the memory;
selecting, based at least in part on two or more non-overlapping sub-portions of the key split, a respective two or more random values from a plurality of random values by indexing, using the two or more non-overlapping sub-portions of the key split, into two or more locations of an entropy table to retrieve the two or more random values associated with the two or more locations of the entropy table, including using a first non-overlapping sub-potion of the key split to index into a first location of the entropy table to retrieve a first random value from the plurality of random values, and using a second non-overlapping sub-potion of the key split to index into a second location of the entropy table to retrieve a second random value from the plurality of random values;
generating an intermediate encryption key based at least in part on the two or more random values, wherein the two or more random values include the first random value and the second random value;
performing a mixing function on the intermediate encryption key to generate an encryption key, wherein the encryption key is unique to the instance of writing the data to the memory and is unique to a memory location in the memory;
encrypting the data using the encryption key; and
storing the encrypted data and the key split to the memory.

2. The method of claim 1, wherein selecting the two or more random values further comprises:
retrieving, from the entropy table populated with the plurality of random values, the two or more random values.

3. The method of claim 1, wherein generating the intermediate encryption key further comprises:
generating the intermediate encryption key by combining the plurality of random values.

4. A system comprising:
memory; and
logic circuitry configured to:
generate a random number as a key split associated with an instance of writing a data to the memory, wherein the key split is unique to the instance of writing the data to the memory,
select, based at least in part on two or more non-overlapping sub-portions of the key split, a respective two or more random values from a plurality of random values by indexing, using the two or more non-overlapping sub-portions of the key split, into two or more locations of an entropy table to retrieve the two or more random values associated with the two or more locations of the entropy table, including using a first non-overlapping sub-potion of the key split to index into a first location of the entropy table to retrieve a first random value from the plurality of random values, and using a second non-overlapping sub-potion of the key split to index into a second location of the entropy table to retrieve a second random value from the plurality of random values, generate an intermediate encryption key based at least in part on the two or more random values, wherein the two or more random values include the first random value and the second random value, perform a mixing function on the intermediate encryption key to generate an encryption key, wherein the encryption key is unique to the instance of writing the data to the memory and is unique to a memory location in the memory, encrypt the data using the encryption key, and store the encrypted data and the key split to the memory.

5. The system of claim 4 wherein the logic circuitry is further configured to:

retrieve, from the entropy table populated with the plurality of random values, the two or more random values.

6. The system of claim 5, wherein the logic circuitry is further configured to:

responsive to a power-up cycle of a system comprising the entropy table:
clear the entropy table,
generate the plurality of random values for the entropy table, and populate the entropy table with the generated plurality of random values.

7. The system of claim 4, wherein the logic circuitry is further configured to:

generate the intermediate encryption key by combining the plurality of random values.

8. The system of claim 7, wherein the logic circuitry is further configured to:

perform the mixing function on the intermediate encryption key to generate the encryption key such that there is not a one-to-one correspondence between a value of a portion of the intermediate encryption key and a value of a corresponding portion of the encryption key.

9. The system of claim 4, wherein the logic circuitry is further configured to:

retrieve the key split stored in memory;
generate a decryption key based at least in part on the key split using the entropy-based key derivation function; and
decrypt the encrypted data using the decryption key.

10. The system of claim 9, wherein the logic circuitry is further configured to:

retrieve, from the entropy table populated with the plurality of random values, the two or more random values; and generate the decryption key based at least in part on the two or more random values.

11. A non-transitory computer-readable medium comprising instructions that upon execution cause a processor to:

generate a random number as a key split associated with an instance of writing a data to memory, wherein the key split is unique to the instance of writing the data to the memory;

select, based at least in part on two or more non-overlapping sub-portions of the key split, a respective two or more random values from a plurality of random values by indexing, using the two or more non-overlapping sub-portions of the key split, into two or more locations of an entropy table to retrieve the two or more random values associated with the two or more locations of the entropy table, including using a first non-overlapping sub-potion of the key split to index into a first location of the entropy table to retrieve a first random value from the plurality of random values, and using a second non-overlapping sub-potion of the key split to index into a second location of the entropy table to retrieve a second random value from the plurality of random values;

generate an intermediate encryption key based at least in part on the two or more random values, wherein the two or more random values include the first random value and the second random value;

perform a mixing function on the intermediate encryption key to generate an encryption key, wherein the encryption key is unique to the instance of writing the data to the memory and is unique to a memory location in the memory;

encrypt the data using the encryption key; and store the encrypted data and the key split to the memory.

12. The non-transitory computer-readable medium of claim 11, wherein the instructions that upon execution cause the processor to select the two or more random values from the plurality of random values further comprise instructions that upon execution cause the processor to:

retrieve, from the entropy table populated with the plurality of random values, the two or more random values.

13. The non-transitory computer-readable medium of claim 11, wherein the instructions that upon execution cause the processor to perform the mixing function on the intermediate encryption key to generate the encryption key further comprise instructions that upon execution cause the processor to:

perform the mixing function on the intermediate encryption key to generate the encryption key such that there is not a one-to-one correspondence between a value of a portion of the intermediate encryption key and a value of a corresponding portion of the encryption key.

* * * * *